United States Patent
Yamamoto

(10) Patent No.: US 10,581,308 B2
(45) Date of Patent: Mar. 3, 2020

(54) MOVING-MAGNET TYPE LINEAR MOTOR CONTROLLING SYSTEM AND MANUFACTURING METHOD OF PARTS

(71) Applicant: CANON KABUSHIKI KAISHA, Tokyo (JP)

(72) Inventor: Takeshi Yamamoto, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 451 days.

(21) Appl. No.: 15/285,016

(22) Filed: Oct. 4, 2016

(65) Prior Publication Data

US 2017/0117829 A1    Apr. 27, 2017

(30) Foreign Application Priority Data

Oct. 22, 2015    (JP) ................. 2015-207774

(51) Int. Cl.
*H02K 41/03*    (2006.01)
*H02P 6/00*    (2016.01)
(Continued)

(52) U.S. Cl.
CPC ........... *H02K 41/031* (2013.01); *H02P 6/006* (2013.01); *H02P 2006/045* (2013.01)

(58) Field of Classification Search
CPC ..... A61B 34/30; A61B 1/0055; A61B 1/0057; A61B 1/0056; A61B 1/008; A61B 1/0011; A61B 1/00154; A61B 1/0016; A61B 1/0053; A61B 1/018; A61B 2017/00314; A61B 2017/3445; A61B 2034/301; A61B 2034/306; A61B 2034/715; A61B 2034/742; A61B 2050/185;
(Continued)

(56) References Cited

U.S. PATENT DOCUMENTS 5,032,975 A    7/1991    Yamamoto
5,136,222 A    8/1992    Yamamoto
(Continued)

FOREIGN PATENT DOCUMENTS

CN    1931628    3/2007
CN    101268609    9/2008
(Continued)

OTHER PUBLICATIONS

U.S. Appl. No. 15/119,805, filed Aug. 15, 2016.
(Continued)

*Primary Examiner* — Shawki S Ismail
*Assistant Examiner* — Zoheb S Imtiaz
(74) *Attorney, Agent, or Firm* — Venable LLP

(57) ABSTRACT

A moving-magnet type linear motor controlling system which can highly accurately control carts even when a plurality of coil units apply forces to the carts is provided. The moving-magnet type linear motor controlling system has: a plurality of coil units having a plurality of coils; a position detecting unit for detecting the positions of the plural carts which are moved along the plurality of coil units; and a controlling unit for determining a ratio of currents which are supplied to the plural coil units on the basis of the positions of the plural carts and an impedance and thrust characteristics of each of the plural coil units.

8 Claims, 12 Drawing Sheets

(51) Int. Cl.
*H02P 6/04* (2016.01)
*H02P 25/06* (2016.01)

(58) Field of Classification Search
CPC ...... A61B 2090/064; A61B 2090/3614; A61B 34/71; A61B 34/76; A61B 50/10; A61B 50/13; A61B 50/15; A61B 50/18; A61B 6/0457; A61B 6/0471; A61B 6/14; A61B 6/548; A61B 2560/0437; A61B 5/117; A61B 5/1172; A61B 5/1176; A61B 6/4283; A61B 6/4405; A61B 6/462; A61B 6/547; A61B 5/1171; A61B 6/06; A61B 6/102; A61B 6/542; A61B 8/4405; A61B 8/4427; A61B 8/461; A61B 8/467; A61B 8/546; A61B 8/565; H02K 11/21
See application file for complete search history.

(56) References Cited

U.S. PATENT DOCUMENTS

| | | | |
|---|---|---|---|
| 6,281,644 B1 * | 8/2001 | Komatsu | H02K 16/00 310/12.04 |
| 6,359,677 B2 * | 3/2002 | Itoh | G03F 7/70716 318/625 |
| 8,872,449 B2 | 10/2014 | Tojo | |
| 2003/0006765 A1 * | 1/2003 | Nekado | G01D 5/2033 324/258 |
| 2009/0140686 A1 | 6/2009 | Potze | |
| 2011/0050007 A1 * | 3/2011 | Kubo | H02P 3/24 310/12.19 |
| 2016/0315574 A1 * | 10/2016 | Kawashima | H02K 41/031 |
| 2017/0212494 A1 * | 7/2017 | Bhatt | G05B 19/19 |

FOREIGN PATENT DOCUMENTS

| | | |
|---|---|---|
| JP | 5-30784 | 2/1993 |
| JP | H5-30784 | 2/1993 |
| JP | 5-191962 | 7/1993 |
| JP | 7-15900 | 1/1995 |
| JP | 2006-87178 | 3/2006 |
| JP | 2008-521379 | 6/2008 |
| JP | 2008-161019 | 7/2008 |
| JP | 2009-120318 | 6/2009 |
| JP | 2011-50220 | 3/2011 |
| JP | 2014-3211 | 1/2014 |
| TW | 201230660 | 7/2012 |

OTHER PUBLICATIONS

U.S. Appl. No. 15/199,251, filed Jun. 30, 2016.
Chinese Office Action dated Dec. 28, 2018 in corresponding Chinese Application No. 201610902209.6 (with whole English language translation).
Notification of Written Submission of Publications dated Jun. 17, 2019 issued in corresponding Japanese Application No. 2015-207774.
Japanese Office Action dated Aug. 13, 2019 during prosecution of related Japanese application No. 2015-207774. (English-language machine translation included.).
Chinese Office Action dated Sep. 18, 2019 during prosecution of related Chinese application No. 201610902209.6. (English-language machine translation included.).

* cited by examiner

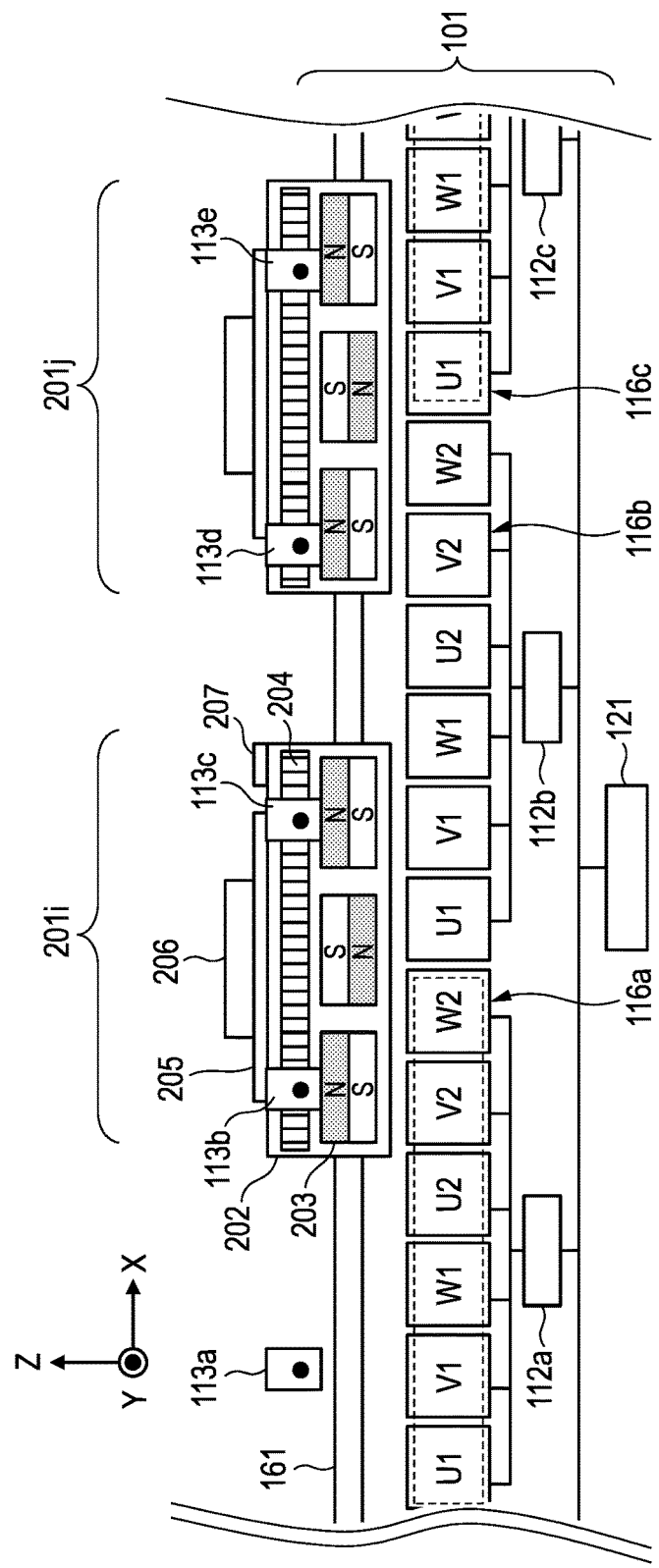

MOVING-MAGNET TYPE LINEAR MOTOR CONTROLLING SYSTEM AND MANUFACTURING METHOD OF PARTS

BACKGROUND OF THE INVENTION

Field of the Invention

The present invention relates to a linear motor controlling system which is used for a driving or the like of carts of a conveying apparatus for factory automation (FA) and, more particularly, to a controlling system of a moving-magnet type linear motor.

Description of the Related Art

Generally, in a factory-automated production line for assembling industrial products, a conveying system for conveying parts or the like is used. As such a conveying system, a moving-magnet type linear motor system having a mover provided with a plurality of permanent magnets, coils arranged along a moving path of the mover, and current controllers for supplying currents to the coils has been proposed.

Japanese Patent Application Laid-Open No. H05-30784 proposes a driver controlling apparatus of a vertical type linear motor. According to such a driver controlling apparatus, it has a plurality of armature coils, an exciting current to each armature coil is controlled in accordance with a position detection value of the mover, and only when the position detection value lies within a predetermined threshold value, the armature coil is energized, thereby reducing electric power consumption.

Japanese Patent Application Laid-Open No. 2011-50220 proposes a dispersion-arranged linear motor. According to such a dispersion-arranged linear motor, a current which is supplied to a coil is controlled on the basis of a distance between adjacent stators.

Japanese Patent Application Laid-Open No. H05-191962 proposes a moving-field type linear motor. According to such a linear motor, a lead switch is used for control of an energization to coils on a stator side, thereby supplying a current to only a specific coil. In more detail, according to the moving-field type linear motor, by turning on the lead switch at a point of time when a tip of a permanent magnet of a mover has reached an armature coil, the current is supplied to the coil.

SUMMARY OF THE INVENTION

However, according to the technique disclosed in Japanese Patent Application Laid-Open No. H05-30784, since ON/OFF of the energization is merely controlled in accordance with a position of the mover, a copper loss and a heat generation associated with the copper loss increase. If such a heat generation is propagated to a casing or the like, a deformation of the casing or the like increases and it is difficult to highly accurately control the mover. According to the technique disclosed in Japanese Patent Application Laid-Open No. 2011-50220, since it relates to the system in which only one mover is controlled per stator, control is made in such a manner that a plurality of movers do not simultaneously enter one stator, the distance between the movers cannot be set to a value smaller than a predetermined value, and the plurality of movers cannot be highly accurately controlled. According to the technique disclosed in Japanese Patent Application Laid-Open No. H05-191962, since the energization control to each armature coil is made by switching the lead switch connected to each armature coil, the switching of the energization to the coil is determined irrespective of the positions of the other movers. Therefore, if the plurality of movers exist at positions where they receive a thrust from one armature coil, it is difficult to highly accurately control the mover.

The invention is made in consideration of the foregoing circumstances and it is an aspect of the invention to provide a moving-magnet type linear motor controlling system in which even in the case where a plurality of coil units apply thrusts to a cart, the cart can be highly accurately controlled.

According to an aspect of the present invention, a moving-magnet type linear motor controlling system comprises: a plurality of coil units having a plurality of coils; a position detecting unit configured to detect positions of a plurality of carts which are moved along the plurality of coil units; and a controlling unit configured to determine a ratio of currents which are supplied to the plurality of coil units on the basis of the positions of the plurality of carts and an impedance and thrust characteristics of each of the plurality of coil units.

According to an embodiment of the invention, a ratio of the currents which are supplied to the coil units is determined on the basis of the positions of the plurality of carts and an impedance and thrust characteristics of each of the plurality of coil units. Thus, even when the cart is controlled by the plurality of coil units, the current to obtain the thrust necessary for the cart can be accurately calculated with respect to each coil unit on the basis of the ratio. Therefore, even when the plurality of coil units apply the thrusts to the cart, the cart can be highly accurately controlled.

Further features of the present invention will become apparent from the following description of exemplary embodiments with reference to the attached drawings.

BRIEF DESCRIPTION OF THE DRAWINGS

FIG. 8 is a layout diagram of carts according to the second and fifth embodiments of the invention.

DESCRIPTION OF THE EMBODIMENTS

Preferred embodiments of the present invention will now be described in detail in accordance with the accompanying drawings.

First Embodiment

Figure 1:
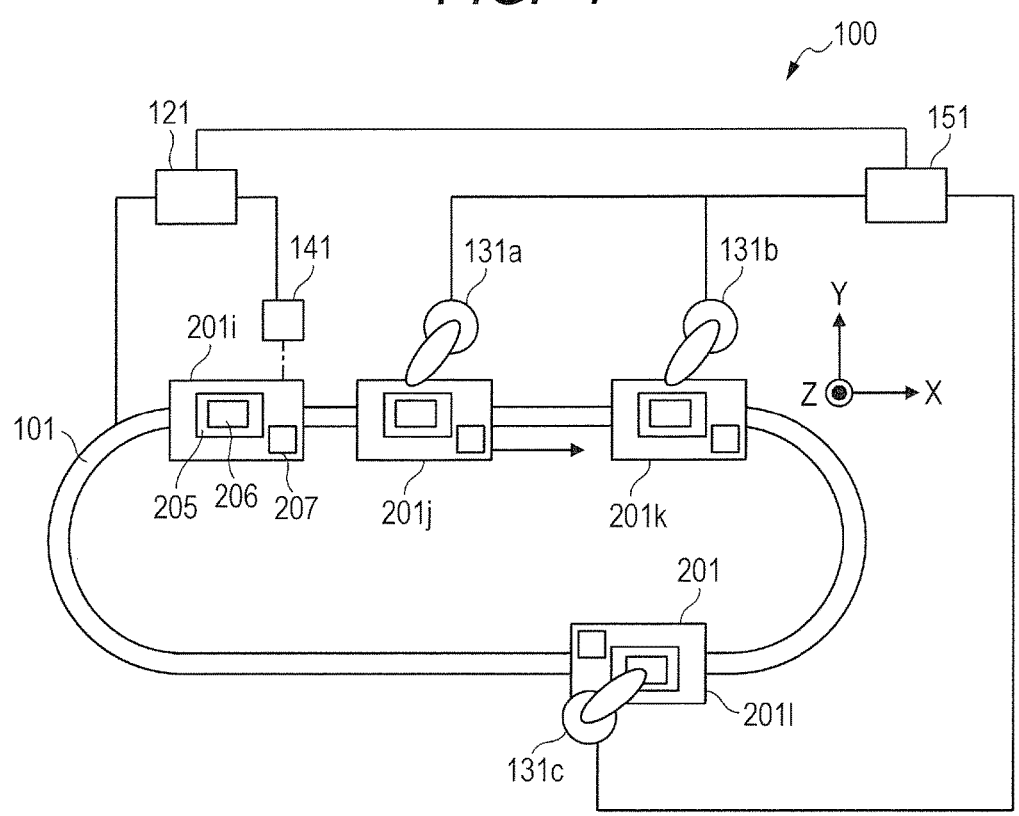
FIG. 1 is a schematic diagram illustrating a whole construction of a work machining system according to the first embodiment of the invention.

A work machining system 100 as a moving-magnet type linear motor controlling system according to the first embodiment of the invention will be described hereinbelow with reference to the drawings. FIG. 1 is a schematic diagram illustrating a whole construction of the work machining system 100. The work machining system 100 has a conveying path 101, a conveying system controller 121, processing apparatuses 131a to 131c, an RFID reader 141, a processing controller 151, and carts 201i to 201l and is disposed on a horizontal mount (not shown).

The carts 201i to 201l are disposed on the conveying path 101 so as to be movable along a guide rail 161, which will be described hereinlater. The conveying system controller 121 has a CPU (Central Processing Unit) and a memory (not shown) such as RAM, ROM, or the like and controls the running operations of all of the carts 201i to 201l on the conveying path 101. Information such as thrust constant profile, impedance of a coil unit 116, and the like, that is, information necessary to calculate a current which is supplied to the coil unit 116 has been stored in the memory. The processing apparatuses 131a to 131c perform a machining of works 206 put on the cart 201. The processing apparatuses 131a to 131c execute various kinds of processes such as coating of an adhesive agent to the works 206, attaching and detaching of a member, irradiation of a light beam, and the like, thereby manufacturing parts. The RFID reader 141 is connected to the conveying system controller 121. The RFID reader 141 reads an RFID tag 207 attached to the cart 201 and transmits cart passing information including a cart ID to the conveying system controller 121. On the basis of the received information, the conveying system controller 121 specifies the cart which has passed through a detecting range of the RFID reader 141.

The processing controller 151 is connected to the processing apparatuses 131a to 131c and the conveying system controller 121. The processing controller 151 makes the processing apparatuses 131a to 131c operative to the carts 201i to 201l which are moved by the conveying system controller 121, thereby sequentially executing processes to the works 206 mounted to the carts 201i to 201l, respectively. Each of the carts 201i to 201l has a work holder 205 and the RFID tag 207. The work holder 205 is a holder to hold the work 206 on each of the carts 201i to 201l. The cart ID as a peculiar identifier to distinguish each of the carts 201i to 201l has been registered in the RFID tag 207. The carts 201i to 201l are moved along the conveying path 101. Although the four carts 201i to 201l are illustrated in FIG. 1, the number of carts is not limited to 4. Although the conveying path 101 forms an elliptic circulating path, it is not limited to such a shape. In FIG. 1, a conveying direction of the cart 201i is defined as an X axis, a vertical direction is defined as a Z axis, and an axis which perpendicularly crosses the X axis and the Z axis is defined as a Y axis, respectively.

Figure 2:
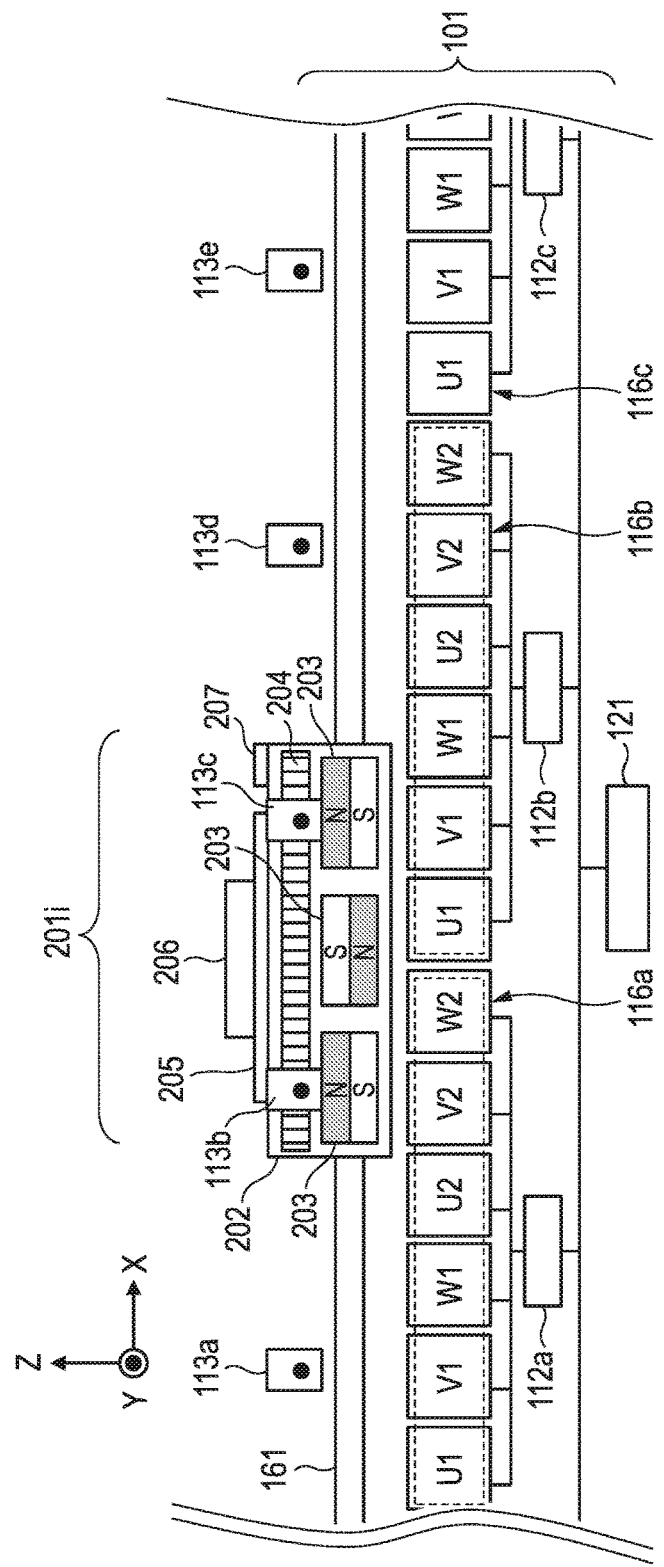
FIG. 2 is a layout diagram of a cart in the work machining system according to the first embodiment of the invention.

FIG. 2 is a layout diagram of the cart 201i in the work machining system 100 according to the embodiment. Although the cart 201i will be described as an example in FIG. 2, a construction of each of the carts 201j to 201l is also similar to that of the cart 201i. The cart 201i has a cart bracket 202, permanent magnets 203, a scale 204, the work holder 205, and the RFID tag 207. The permanent magnets 203, scale 204, work holder 205, and RFID tag 207 are attached to the cart bracket 202. A guide block (not shown) is fixed to the cart bracket 202. By attaching the guide block to the guide rail 161, the cart 201 is supported so as to be movable in the extending direction of the guide rail 161. The three permanent magnets 203 are arranged on the cart bracket 202 and an N-pole and an S-pole of each permanent magnet 203 are alternately arranged. Although the permanent magnet 203 is constructed by three permanent magnets in the embodiment, the number of permanent magnets is not limited to 3. Position information has been recorded on the scale 204 along a moving direction of the cart 201i.

The conveying path 101 has a casing (not shown), the guide rail 161, encoders (position detecting units) 113a to 113e, coil units 116a to 116c, and current controllers 112a to 112c. The current controllers 112a to 112c, encoders 113a to 113e, coil units 116a to 116c, and guide rail 161 are attached to the casing. The current controllers 112a to 112c control currents which are supplied to the coil units 116a to 116c on the basis of the position information or the like of the cart which is transmitted from the conveying system controller 121.

The encoders 113a to 113e are attached along the conveying path 101 at such intervals that even if the cart 201i exists at any position on the conveying path 101, the position of the cart 201i can be detected. The encoders 113a to 113e read a pattern of the scale 204 and transmits a position on the scale 204, that is, scale position information to the conveying system controller 121 through a transmitting path (not shown). It is desirable that in order to detect the position of the cart 201i, the encoders 113a to 113e and the scale 204 have a position resolution which is sufficiently smaller than a positioning precision which is required for the controlling system. As an example, in order to acquire a positioning precision of ±5 μm, the high accurate encoders 113a to 113e and scale 204 having a resolution of about 0.5 μm are used. When currents are supplied to the coil units 116a to 116c and there is a predetermined positional relation between them and the permanent magnets 203, the coil units 116a to 116c can generate electromagnetic forces. The cart 201i is moved or stopped on the conveying path 101 by the generated electromagnetic forces. The conveying system controller 121 controls the currents of the coil units 116a to 116c in accordance with the position information of the cart 201i which is transmitted from the encoders 113a to 113e. Thus, the conveying system controller 121 can move the cart 201i and stop the cart 201i at the proper position.

Figure 3:
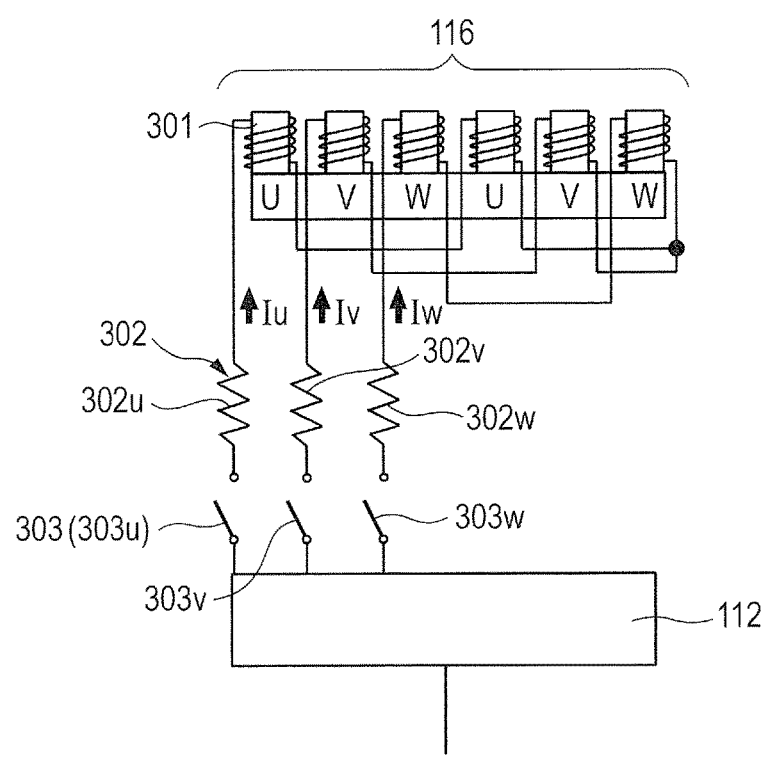
FIG. 3 is a schematic diagram of a coil unit according to the first embodiment of the invention.

FIG. 3 is a schematic diagram of the coil unit 116 according to the embodiment. In the embodiment, the coil unit 116 has six coils 301 in such a manner that in order to enable a driving of three phases comprising a U phase, a V phase, and a W phase, every two coils 301 of each phase are serially connected. Although the coil unit 116 is constructed by six coils in the embodiment, it may be constructed by three coils or only one coil.

A current detector 302 is connected to a current controller 112 and detects the current which is supplied to the coil 301 of each phase from the current controller 112. In more detail, the current detector 302 has resistors 302u, 302v, and 302w and measures the current on the basis of a resistance value of each of the resistors 302u, 302v, and 302w and a voltage across each resistor. The current controller 112 controls the current which is supplied to the coil unit 116 on the basis of a current instruction value which is input to the current controller 112 and information of the current which is detected by the current detector 302. A switch 303, that is, switches 303u, 303v, and 303w are arranged between the current controller 112 and the current detector 302. The current controller 112 controls ON/OFF of the switches 303u, 303v, and 303w, respectively.

Figure 4:
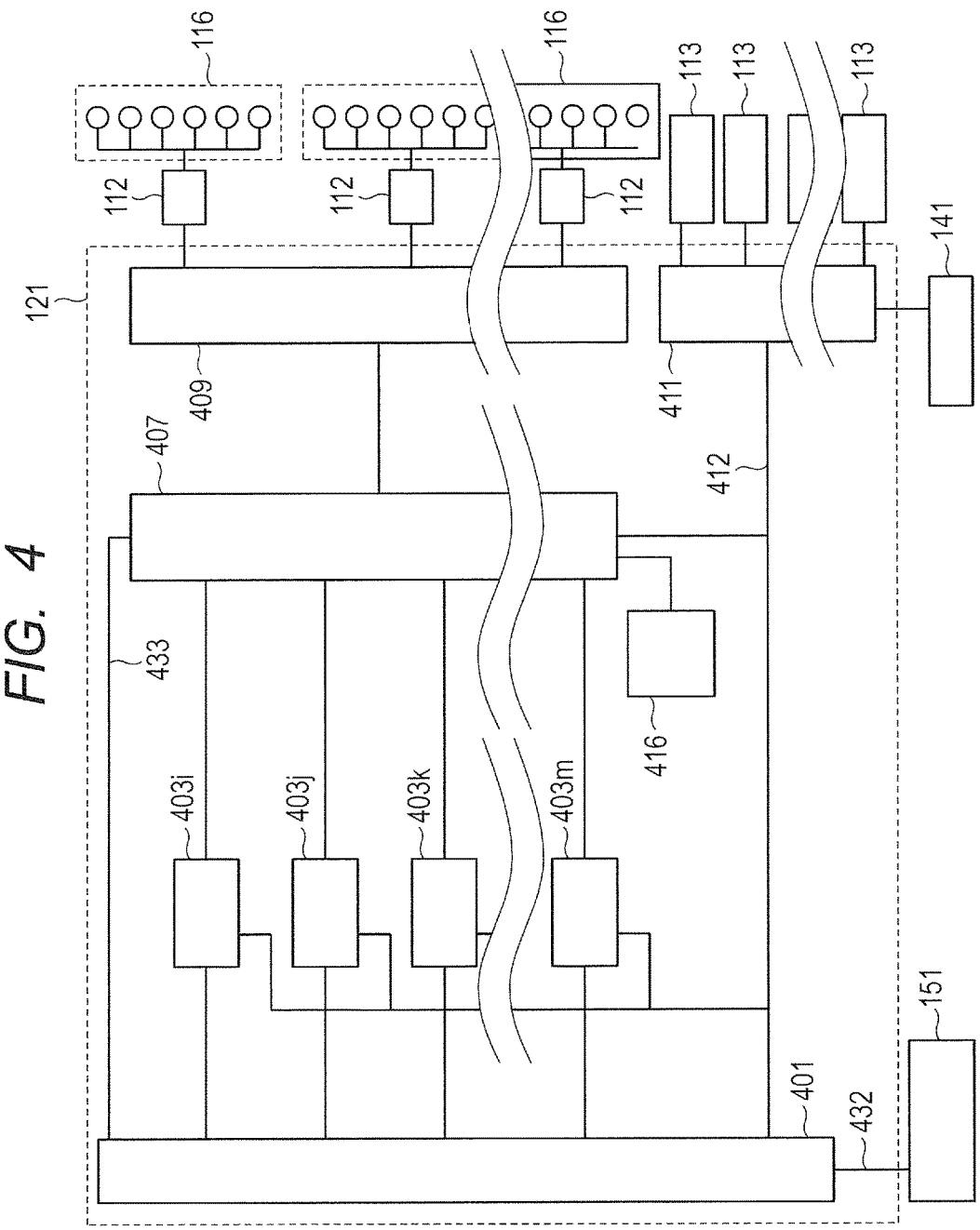
FIG. 4 is a block diagram of a conveying system controller according to the first embodiment of the invention.

FIG. 4 is a schematic diagram of the conveying system controller 121. The conveying system controller 121 has a cart group controller 401, a cart controller 403, a current calculating unit 407, a current group controlling unit 409, a cart position calculating unit 411, and a thrust constant profiling unit 416. The cart group controller 401 and the processing controller 151 are electrically connected through a transmitting path 432. The processing controller 151 transmits a target position of every cart ID as target position information to the cart group controller 401. The cart group controller 401 is electrically connected to the current calculating unit 407 through a transmitting path 433. The cart group controller 401, cart controller 403, and current calculating unit 407 are electrically connected to the cart position calculating unit 411 through a transmitting path 412. The cart group controller 401 can transmit a cart position of every cart ID to the processing controller 151. The cart group controller 401 outputs a target position of each cart 201 at specific time to the cart controller 403 on the basis of the target position information and the cart position information which are transmitted from the processing controller 151.

The cart controller 403 calculates a thrust necessary for control of the cart 201 on the basis of the target position information and the cart position information which are input from the cart group controller 401. In more detail, the cart controller 403 calculates the thrust on the basis of a difference between the position of the cart 201 and its target position. The cart controller 403 outputs thrust information to the current calculating unit 407. The conveying system controller 121 has the cart controllers 403 of the number as many as the number of carts 201 as control targets. One cart 201 is allocated to each cart controller 403. In FIG. 4, a cart controller 403i controls the cart 201i and a cart controller 403j controls the cart 201j. The current calculating unit 407 produces a current instruction value group necessary for each coil unit 116 on the basis of a plurality of thrust information, the cart position information, and thrust constant profiles (thrust characteristics) stored in the thrust constant profiling unit 416. The current calculating unit 407 outputs the current instruction value group to the current group controlling unit 409. It is assumed that the thrust constant profiles have previously been stored in the thrust constant profiling unit 416.

The current group controlling unit 409 outputs the current instruction value to each current controller 112 on the basis of the current instruction value group. The current instruction value which is output from the current group controlling unit 409 is a current value which is supplied to each coil unit 116. The cart position calculating unit 411 calculates the position of each cart 201 on the basis of the scale position information received from the encoder 113 and the cart passing information received from the RFID reader 141. The cart position calculating unit 411 transmits the calculated position as cart position information to the cart group controller 401, cart controller 403, and current calculating unit 407 through the transmitting path 412. Since the position information of every cart ID is included in the cart position information, the cart group controller 401 and the cart controller 403 can grasp the position of the cart of every cart ID.

Figure 5:
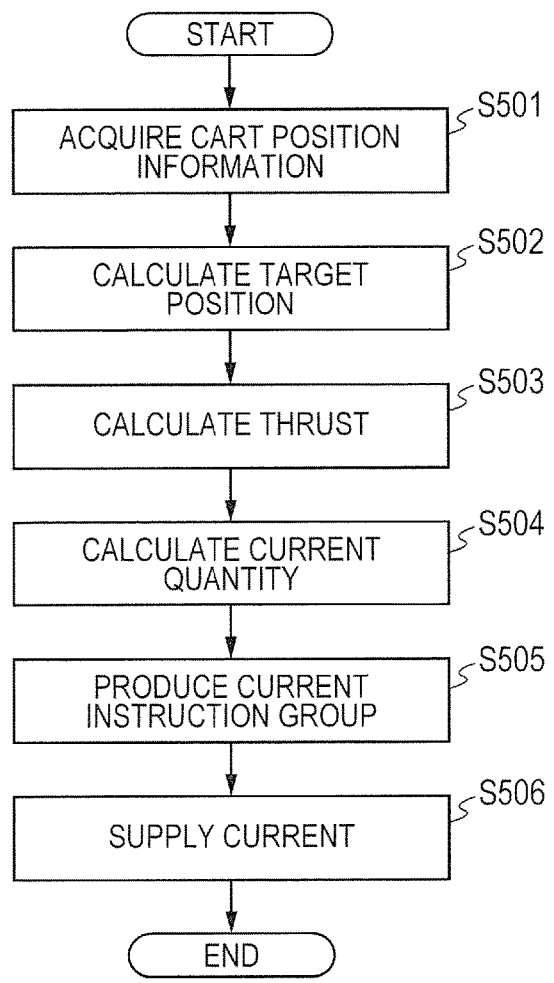
FIG. 5 is a flowchart illustrating control of the cart according to the first embodiment of the invention.

FIG. 5 is a flowchart illustrating control of the cart according to the embodiment. Processing steps of the flowchart illustrated in FIG. 5 are executed when the conveying system controller 121 starts the control of all carts 201. In step S501, the cart group controller 401 acquires the cart position information of each cart 201. In more detail, the cart group controller 401 receives the cart position information of each cart 201 from the cart position calculating unit 411. In step S502, the cart group controller 401 calculates a target position of the cart 201. In more detail, the cart group controller 401 receives the target position information of the cart 201 from the processing controller 151, calculates a target position of each cart 201 at specific time, and outputs the target position information to the cart controller 403. In step S503, the cart controller 403 calculates a thrust necessary for control of the cart 201 on the basis of the target position information and the cart position information of the cart 201 and outputs the calculated thrust as thrust information to the current calculating unit 407.

In step S504, the current calculating unit 407 calculates a current which is supplied to each coil unit 116 on the basis of the thrust information and thrust constant profile of each cart 201 and an impedance of the coil unit 116. In more detail, a description will be made with reference to FIGS. 6A, 6B, 7A, and 7B.

Figure 6A:
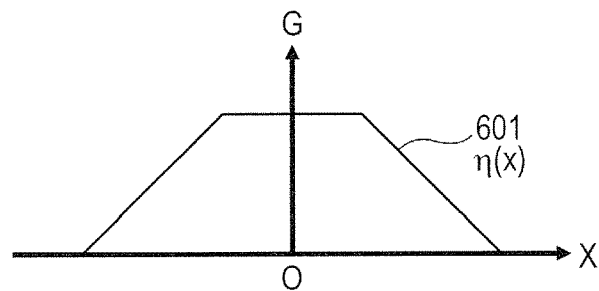
FIGS. 6A and 6B are diagrams illustrating thrust constant profiles according to the first embodiment of the invention.
Figure 6B:
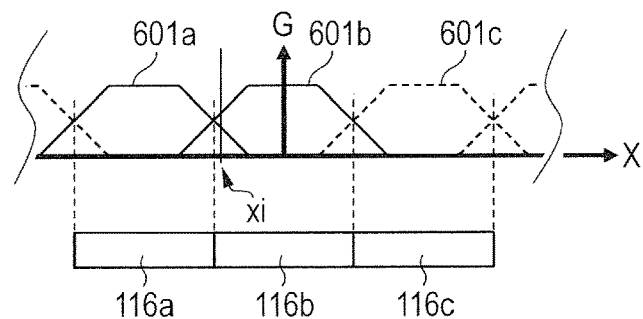

FIGS. 6A and 6B are diagrams illustrating thrust constant profiles according to the embodiment. In FIG. 6A, a thrust constant profile 601 shows a graph in which a relation between a position x of the cart and a thrust constant η is plotted. The thrust constant shows a magnitude [N] of the thrust which is generated per unit q-axis current [A]. The q-axis current indicates a current component which contributes to a progressing direction of the cart which is used in general vector control of a motor. A d-axis current indicates a current component which perpendicularly crosses the q-axis current.

The thrust constant profile can be expressed by Ga(x), where a denotes an index of the coil unit 116.

As mentioned above, the thrust constant profile can be expressed as a function in which the position x of the cart 201 is set to a variable every index of the coil unit 116.

FIG. 6B is a graph showing thrust constant profiles 601a to 601c in which an axis of abscissa indicates the position x of the cart 201 and the thrust constants of the plurality of coil units 116a to 116c to the position x are plotted to an axis of ordinate. In more detail, in FIG. 6B, the thrust constant profile 601a is a thrust constant profile of the coil unit 116a, the thrust constant profile 601b is a thrust constant profile of the coil unit 116b, and the thrust constant profile 601c is a thrust constant profile of the coil unit 116c, respectively. It is assumed that each cart 201 is moved in the +x direction. The permanent magnet 203 attached to the cart 201 generates an interlinkage magnetic flux to each coil 301 of the coil units 116a to 116c. As illustrated in FIG. 6B, the adjacent thrust constant profiles 601a and 601b overlap partially and the adjacent thrust constant profiles 601b and 601c overlap partially.

FIG. 6B illustrates a case where one cart 201i exists at a position xi in such an overlap interval. The cart 201i receives thrusts from the two coil units 116a and 116b and corresponds to the position of the cart 201i in FIG. 2. On the basis of the position of the cart 201i, the cart group controller 401 selects the coil unit 116 to which the current is supplied. For example, in FIG. 6B, the cart group controller 401 selects the coil units 116a and 116b. In FIG. 6B, when the cart 201i exists at the position xi, thrust constants of the coil units 116a and 116b are equal to Ga(xi) and Gb(xi). In this case, now assuming that a q-axis current value which is supplied to the coil unit 116a by the current controller 112a is equal to Ia and a q-axis current value which is supplied to the coil unit 116b by the current controller 112b is equal to Ib, a thrust Fi in the q-axis direction which is received by the cart 201i can be expressed by the following equation (1).

$$Fi = Ia \cdot Ga(xi) + Ib \cdot Gb(xi) \quad (1)$$

The current calculating unit 407 decides the q-axis current values Ia and Ib so that the thrust which is applied to the cart 201i is equal to Fi.

Figure 7A:
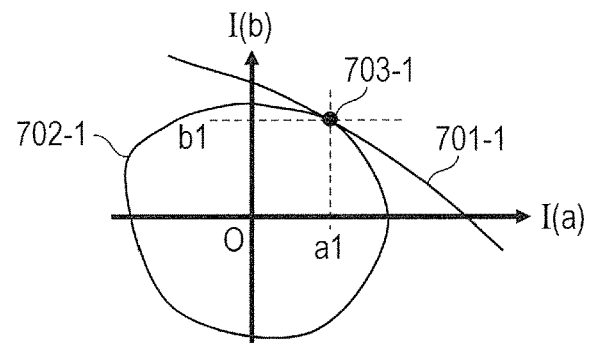
FIGS. 7A and 7B are diagrams illustrating an equal thrust profile and an equal loss profile according to the first embodiment of the invention.
Figure 7B:
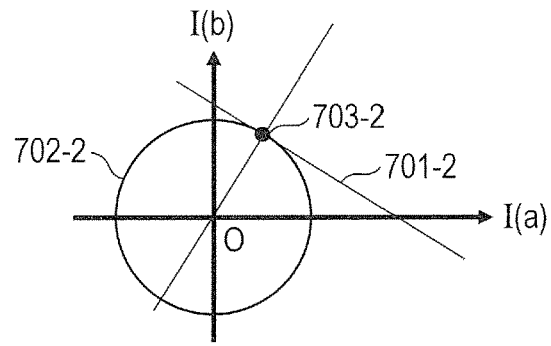

FIGS. 7A and 7B are diagrams for describing a method of deciding the q-axis current values Ia and Ib and are graphs in which the q-axis current value Ia is plotted to an axis of abscissa and the q-axis current value Ib is plotted to an axis of ordinate. In FIG. 7A, an equal thrust profile 701-1 is a profile acquired by schematically plotting a combination of the q-axis current values Ia and Ib by which the thrust Fi becomes constant. An equal loss profile 702-1 is a profile acquired by schematically plotting an equal loss profile by which an energy loss P due to the current supply becomes constant.

The current calculating unit 407 calculates a combination of the q-axis current values Ia and Ib so as to minimize the energy loss when the thrust Fi is applied. That is, the current calculating unit 407 calculates the q-axis current values Ia and Ib which satisfy the following equation (2).

$$\partial P/\partial (Ia) = \partial P/\partial (Ib) = 0 \quad (2)$$

By the equation (2), a contact 703-1 of the equal thrust profile 701-1 and the equal loss profile 702-1 can be calculated. The contact 703-1 corresponds to the q-axis current values Ia and Ib adapted to minimize the energy loss. By supplying the q-axis current values Ia and Ib adapted to minimize the energy loss to the coil units 116a and 116b, an influence by a heat generation or the like due to a copper loss can be reduced.

$$(Ia, Ib) = (a1, b1) \quad (3)$$

When the equation (2) is satisfied, as shown by the equation (3), the equal thrust profile 701-1 and the equal loss profile 702-1 are in contact with each other at the contact 703-1, in other words, values (a1, b1) of the contact 703-1 can be uniquely determined.

When describing more simply, in the case where losses other than the copper loss can be sufficiently ignored as an energy loss and impedances of the two coil units 116a and 116b are almost equal to a value R, the energy loss P can be expressed by the following equation (4).

$$P = R \cdot Ia^2 + R \cdot Ib^2 \quad (4)$$

FIG. 7B illustrates an almost circular equal loss profile 702-2 shown by the equation (4) and an almost rectilinear equal thrust profile 701-2 shown by the equation (2). The equal loss profile 702-2 shown by the equation (4) is almost circular as illustrated in FIG. 7B. When an interaction such as an interference or the like of the magnetic fluxes between the two coil units 116a and 116b is sufficiently small, the equal thrust profile 701-2 is almost rectilinear as illustrated in FIG. 7B. The q-axis current values Ia and Ib adapted to minimize the energy loss P are equal to values of a contact 703-2 of the equal thrust profile 701-2 and the equal loss profile 702-2.

At this time, the q-axis current values Ia and Ib at the contact 703-2 of the equal thrust profile 701-2 and the equal loss profile 702-2 can be expressed by the following equation (5).

$$Ia:Ib = Ga(xi):Gb(xi) \quad (5)$$

The equation (5) is a conditional equation in the case where the equal thrust profile 701-2 shown by an almost straight line and the equal loss profile 702-2 shown by an almost circle are in contact with each other. A ratio of the q-axis current values Ia and Ib is equal to a ratio of the thrust constants Ga(xi) and Gb(xi) at the position xi of the cart 201i. In this manner, the current calculating unit 407 calculates the q-axis current values Ia and Ib which are supplied to the coil units 116a and 116b on the basis of the position xi of the cart 201i, the impedances of the coil units 116a and 116b, and the thrust constant profiles 601a and 601b.

In step S505, the current calculating unit 407 produces the current instruction value group which is transmitted to each coil unit 116 on the basis of a current value calculated in step S504 and outputs to the current group controlling unit 409. In step S506, the current group controlling unit 409 outputs the current value as a current instruction signal to each current controller 112. Each current controller 112 supplies a current to the corresponding coil unit 116 on the basis of a current value of the current instruction signal. For example, the current controller 112a supplies the current Ia to the coil unit 116a and the current controller 112b supplies the current Ib to the coil unit 116b.

As mentioned above, in the embodiment, a ratio of the currents which are supplied to the coil units 116 is determined on the basis of the position x of the cart, the impedance of each coil unit 116, and the thrust constant profiles 601a and 601b. Consequently, even in the case where one cart 201 is controlled by a plurality of coil units 116, the current by which the thrust corresponding to the position of the cart 201 is supplied to the coil unit 116, the cart 201 can be highly accurately controlled. The currents Ia and Ib adapted to minimize the energy loss of the coil units 116 are supplied to the coil units 116a and 116b on the basis of the position x of the cart, the impedance R of the plurality of coil units 116, the thrust constant profiles 601a and 601b, and the ratio of the currents. Therefore, even in the case where one cart 201 receives electromagnetic forces from the plurality of coil units 116, the currents can be supplied to the plurality of coil units 116 while minimizing the energy loss of the coil units 116. Thus, the cart 201 can be highly accurately controlled while suppressing the influence by the heat generation or the like due to the copper loss.

Second Embodiment

A moving-magnet type linear motor controlling system according to the second embodiment of the invention will be described hereinbelow. The second embodiment differs from the first embodiment with respect to a point that a plurality of carts are controlled, and other constructions are common. Therefore, a description of the common portions is omitted.

FIG. 8 is a layout diagram of carts in the work machining system 100 according to the embodiment. As illustrated in FIG. 8, the carts 201i and 201j exist in an interval between the coil units 116a to 116c. The cart 201i (first cart) exists at a position where it can receive the thrusts from the coil unit 116a (second coil unit) and the coil unit 116b (first coil unit). The cart 201j (second cart) exists at a position where it can receive the thrusts from the coil unit 116b (first coil unit) and the coil unit 116c (third coil unit).

In the case where a processing apparatus 131 respectively executes a predetermined processing operation to the works 206 on the carts 201i and 201j, it is necessary that the carts 201i and 201j have been accurately stopped at predetermined positions, respectively. A force due to a disturbance which is received from an ambient environment and a force at the time of the processing operation are applied to the carts 201*i* and 201*j*. Therefore, in order to maintain the carts 201*i* and 201*j* at the predetermined positions, it is necessary to apply a predetermined thrust to each of the carts 201*i* and 201*j*. However, since a magnitude of the thrust which is applied to each of the carts 201*i* and 201*j* changes time-dependently and differs in each of the carts 201*i* and 201*j*, it is not easy to highly accurately control the carts 201*i* and 201*j*. Control of the carts for compensating the change in thrust will be described hereinbelow.

Figure 9:
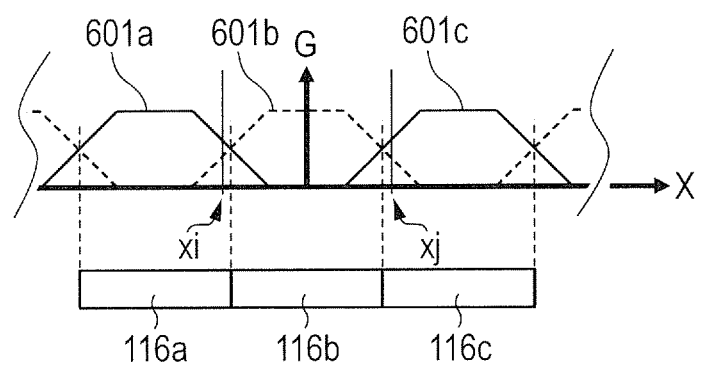
FIG. 9 is a diagram illustrating thrust constant profiles according to the second embodiment of the invention.

FIG. 9 is a diagram illustrating thrust constant profiles according to the embodiment. In more detail, the positions of the carts 201*i* and 201*j* and the thrust constant profiles 601*a* to 601*c* of the coil units 116*a* to 116*c* are illustrated. In the embodiment, the current controller 112*b* turns off the switch 303 so that the current does not flow in the coil unit 116*b*, thereby electrically turning off the coil unit 116*b*. When the current controller 112*b* sets the switch 303 into a turn-on state, one cart, for example, the cart 201*i* is moved and enters the coil unit 116*b*, so that the current flows into the coil unit 116*b*. This is because the current is generated in the coil of the coil unit 116*b* by a magnetic force of the permanent magnet 203 of the cart 201*i*, so that the coil unit 116*b* plays a role of a generator. When the switch 303 is in a turn-on state, an electromagnetic force is generated by the current flowing in the coil unit 116*b* and the thrust is applied to the other cart 201*j*. Thus, the carts 201*i* and 201*j* mutually apply the forces through the coil unit 116*b*. Such a phenomenon becomes a factor of making the movement control of the carts 201*i* and 201*j* unstable. In the embodiment, by setting the switch 303 of the coil unit 116*b*, that is, the switches 303*u*, 303*v*, and 303*w* into a turn-off state, the generation of the unintended thrusts is prevented.

The q-axis current values Ia and Ic which are supplied to the coil units 116*a* and 116*c* are acquired as follows. It is now assumed that thrusts which are necessary for the carts 201*i* and 201*j* are equal to Fi and Fj and a thrust constant of the coil unit 116*a* in the case where the cart 201*i* exists at the position xi is equal to Gai, respectively. It is also assumed that a thrust constant of the coil unit 116*c* in the case where the cart 201*j* exists at a position xj is equal to Gcj. In this case, the current calculating unit 407 calculates the q-axis current values Ia and Ic so as to satisfy the following equations (6) and (7).

$$Fi = Gai \cdot Ia \qquad (6)$$

$$Fj = Gcj \cdot Ic \qquad (7)$$

The current is not supplied to the coil unit 116*b* and the current calculating unit 407 calculates the q-axis current value Ia on the basis of the thrust Fi and the thrust constant Gai at the position xi. Similarly, the current calculating unit 407 calculates the q-axis current value Ic on the basis of the thrust constant Gcj at the position xj. The thrusts Fi and Fj are output from the cart controller 403. The cart controller 403 outputs such an instruction signal that no current is supplied to the coil unit 116*b* to the current calculating unit 407 through the transmitting path 433.

As mentioned above, in the embodiment, the cart controller 403 turns off the switch 303, shuts off the current to the coil unit 116*b*, and controls the carts 201*i* and 201*j*. Thus, since the coil unit 116*b* does not apply the thrust to the plurality of carts 201*i* and 201*j*, the movement control of the carts 201 can be stabilized and each of the carts 201*i* and 201*j* can be highly accurately controlled.

Third Embodiment

A moving-magnet type linear motor controlling system according to the third embodiment of the invention will be described hereinbelow. The third embodiment differs from the first embodiment with respect to a point that a plurality of carts are controlled, and other constructions are common. Therefore, a description of the common portions is omitted.

Figure 10:
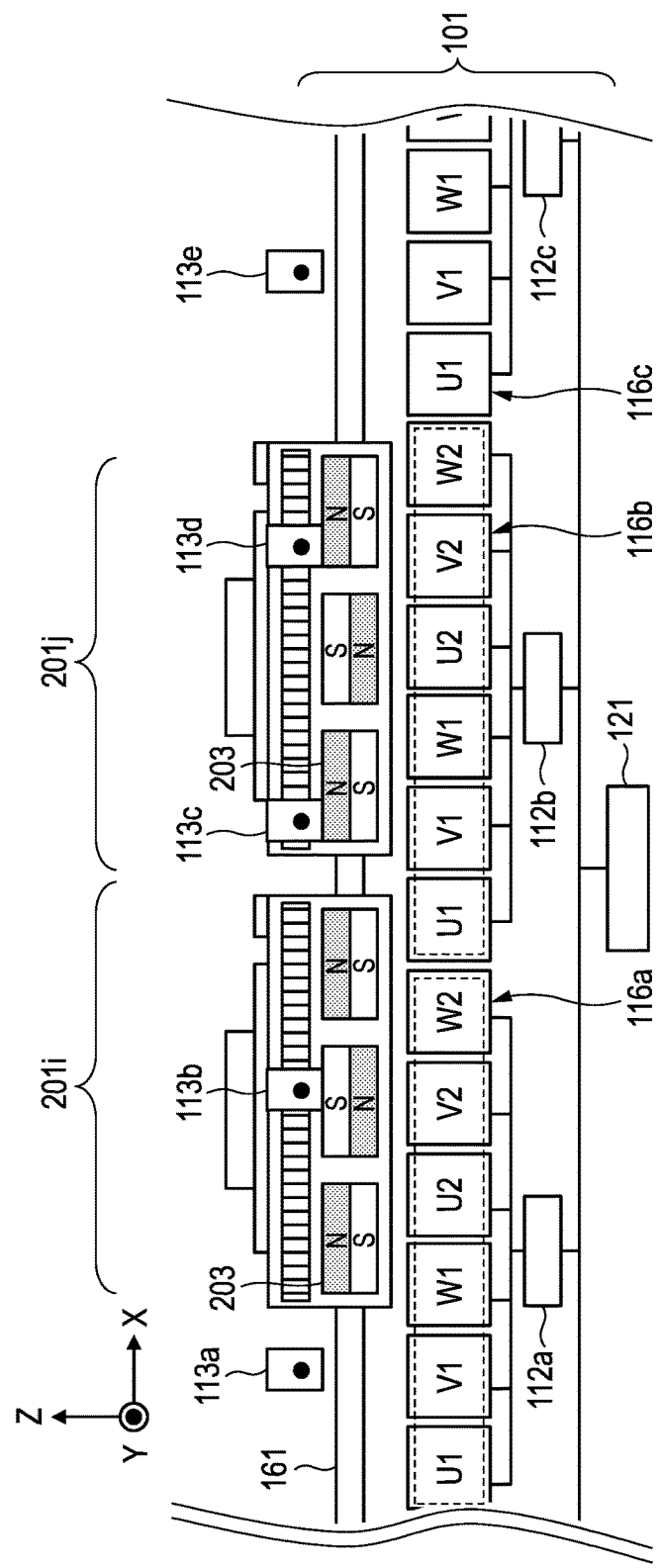
FIG. 10 is a layout diagram of carts according to the third embodiment of the invention.
Figure 11:
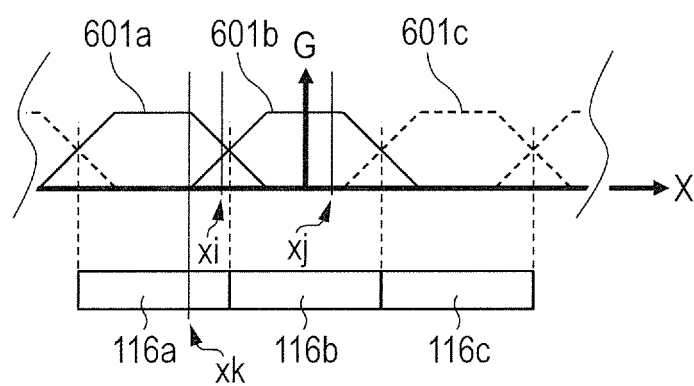
FIG. 11 is a diagram illustrating thrust constant profiles according to the third embodiment of the invention.

FIG. 10 is a layout diagram of carts in the work machining system 100 according to the embodiment. As illustrated in FIG. 10, the cart 201*i* (first cart) exists at a position where it can receive the thrusts from the coil unit 116*a* (second coil unit) and the coil unit 116*b* (first coil unit). The cart 201*j* (second cart) exists at a position where it can receive the thrust from only the coil unit 116*b* (first coil unit). An interval between the carts 201*i* and 201*j* illustrated in FIG. 10 is narrower than the interval between the carts 201*i* and 201*j* in FIG. 8 described in the second embodiment. A description will be made in detail with reference to FIG. 11. FIG. 11 is a diagram illustrating thrust constant profiles and shows the positions of the carts 201*i* and 201*j* and the thrust constant profiles 601*a* to 601*c* of the coil units 116*a* to 116*c*, respectively. In the embodiment, on the basis of the positions of the carts 201*i* and 201*j*, the cart group controller 401 selects the coil units 116*a* and 116*b* to which the currents are supplied. The current controller 112*c* may turn off the switch 303 so that no current flows in the coil unit 116*c* (third coil unit) and may electrically turn off the coil unit 116*c*.

It is now assumed that the thrusts which are necessary for the carts 201*i* and 201*j* are equal to Fi and Fj. It is also assumed that the thrust constant of the coil unit 116*a* in the case where the cart 201*i* exists at the position xi is equal to Gai, a thrust constant of the coil unit 116*b* is equal to Gbi, and a thrust constant of the coil unit 116*b* in the case where the cart 201*j* exists at the position xj is equal to Gbj. In this case, the current calculating unit 407 calculates the q-axis current values Ia and Ib so as to satisfy the following equations (8) and (9).

$$Fi = Gai \cdot Ia + Gbi \cdot Ib \qquad (8)$$

$$Fj = Gbj \cdot Ib \qquad (9)$$

The current calculating unit 407 calculates the q-axis current value Ib on the basis of the thrust constant Gbj and the thrust Fj. The current calculating unit 407 also calculates the q-axis current value Ia which is supplied to the coil unit 116*a* on the basis of the thrust Fi, the thrust constants Gai and Gbi, and the q-axis current value Ib. The calculated q-axis current value Ib is a current value of such a magnitude that the operation of the cart 201*j* can be controlled. The calculated q-axis current values Ia and Ib are current values of such magnitudes that the operation of the cart 201*i* can be controlled. In the control of the cart 201*i*, a ratio of the thrust constants of the coil units 116*a* and 116*b* at the position xi is equal to (Gai:Gbi) and the cart 201*i* is driven by a synthetic thrust acquired by synthesizing the thrusts of the coil units 116*a* and 116*b*. In the control of the cart 201*j*, the thrust constant of the coil unit 116*b* at the position xj is equal to Gbj and the cart 201*j* is driven by only the thrust of the coil unit 116*b*. The current group controlling unit 409 supplies the calculated q-axis current values Ia and Ib to the coil units 116*a* and 116*b*, respectively. Thus, the movement of the carts 201*i* and 201*j* can be highly accurately controlled.

As mentioned above, in the embodiment, with respect to the coil unit 116*b*, the q-axis current value Ib is calculated on the basis of the position xj of the cart 201*j* and the thrust constant profile 601*b* of the coil unit 116*b*. With respect to the coil unit 116*a*, the q-axis current value Ia is calculated on the basis of the position xi of the cart 201*i*, the q-axis current value Ib, and the thrust constant profiles 601*a* and 601*b* of the coil units 116a and 116b. That is, the cart 201i acquires the thrusts from the coil unit 116a and from the coil unit 116b. A total thrust of the cart 201i is sum of the thrust received from the coil unit 116a and the thrust received from the coil unit 116b. Since the q-axis current value Ib to be supplied to the coil unit 116b is calculated on the basis of the position xj of the cart 201j, based on the thrust constant profile at the position xi of the cart 201i, a magnitude of the thrust which the cart 201i receives from the coil unit 116b is calculated. Accordingly, the q-axis current value Ia to be supplied to the coil unit 116a is calculated using the thrust constant profile, so that the thrust which the cart 201i receives from the coil unit 116a compensates (being determined based on a consideration of) the thrust which the cart 201i receives from the coil unit 116b.

Fourth Embodiment

A moving-magnet type linear motor controlling system according to the fourth embodiment of the invention will be described hereinbelow. The fourth embodiment differs from the second embodiment with respect to a point that three coil units are used to control a plurality of carts, and other constructions are common. Therefore, a description of the common portions is omitted.

Figure 12:
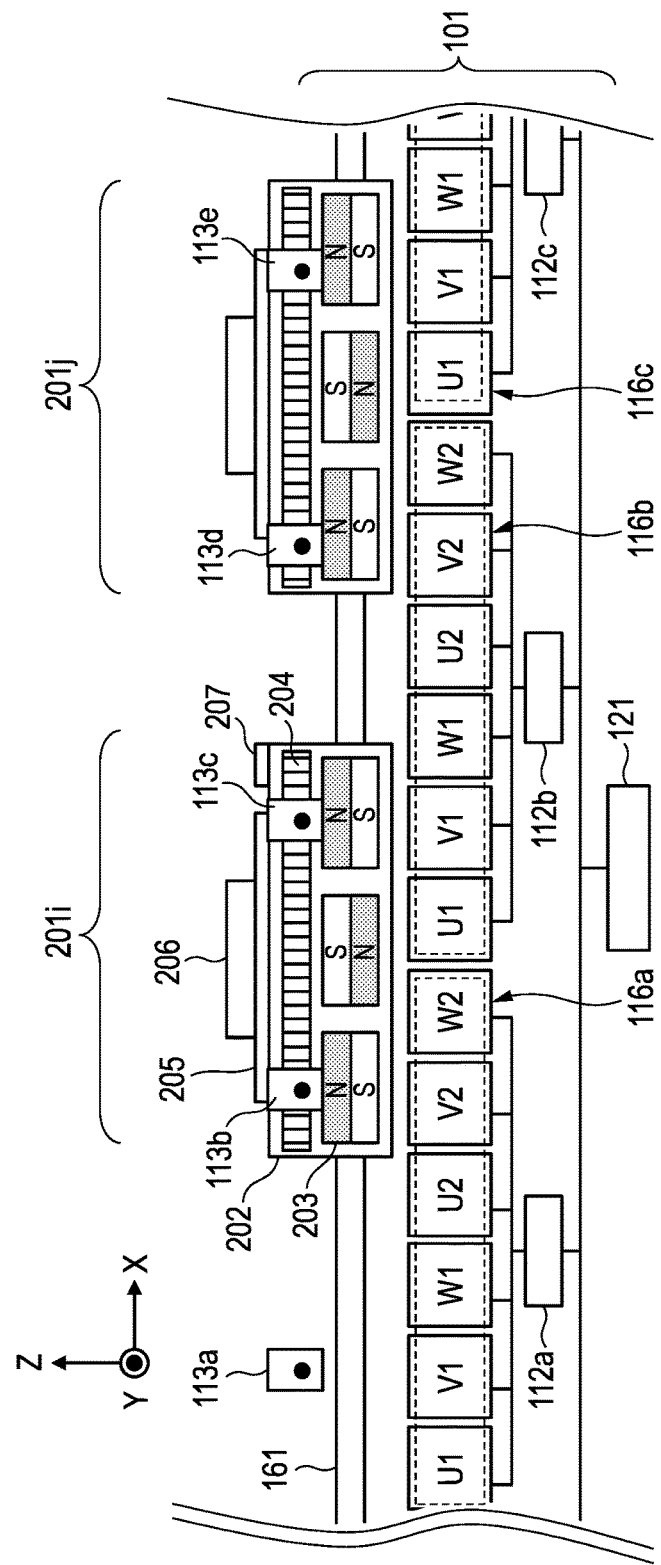
FIG. 12 is a layout diagram of carts according to the fourth embodiment of the invention.

FIG. 12 illustrates a layout diagram of carts according to the embodiment. A layout of the carts 201i and 201j illustrated in FIG. 12 is similar to that in FIG. 8 described in the second embodiment. The cart 201i exists at a position where it can receive the thrusts from the coil units 116a and 116b. The cart 201j exists at a position where it can receive the thrusts from the coil units 116b and 116c.

The q-axis current values Ia to Ic which are supplied to the coil units 116a to 116c are calculated as follows. It is now assumed that the thrusts which are necessary for the carts 201i and 201j are equal to Fi and Fj. It is also assumed that the thrust constant of the coil unit 116a in the case where the cart 201i exists at the position xi is equal to Gai and the thrust constant of the coil unit 116b is equal to Gbi. It is also assumed that the thrust constant of the coil unit 116b in the case where the cart 201j exists at the position xj is equal to Gbj and the thrust constant of the coil unit 116c is equal to Gcj. In this case, the current calculating unit 407 calculates the q-axis current values Ia to Ic so as to satisfy the following equations (10) and (11).

$$Fi = Gai \cdot Ia + Gbi \cdot Ib \quad (10)$$

$$Fj = Gbj \cdot Ib + Gcj \cdot Ic \quad (11)$$

An equal thrust profile in which the thrusts Fi and Fj are equal is acquired from the equations (10) and (11). Also in this case, since the q-axis current values Ia to Ic can be uniquely determined by minimizing the energy loss P, the current calculating unit 407 calculates a combination of the q-axis current values Ia to Ic which satisfies the following equation (12).

$$\partial P/\partial(Ia) = \partial P/\partial(Ib) = \partial P/\partial(Ic) = 0 \quad (12)$$

In a manner similar to the first embodiment, the energy loss other than the copper loss can be sufficiently ignored as an energy loss and when the impedances R of the three coil units 116a to 116c are equal to substantially the same value, the energy loss P adapted to provide the equal loss profile is calculated by the following equation (13).

$$P = R \cdot Ia^2 + R \cdot Ib^2 + R \cdot Ic^2 \quad (13)$$

It is now assumed that the thrust constants when the cart 201i exists at the position xi are equal to Ga(xi) and Gb(xi) and the thrust constants when the cart 201j exists at the position xj are equal to Gb(xj) and Gc(xj), respectively. In this case, the q-axis current values Ia to Ic in the equal thrust profile and the equal loss profile can be expressed by the following equations (14) and (15).

$$Ia:Ib = Ga(xi):Gb(xi) \quad (14)$$

$$Ib:Ic = Gb(xj):Gc(xj) \quad (15)$$

The equations (14) and (15) are conditional equations in the case where a cross point where the two equal thrust profiles expressed by almost straight lines in the equations (10) and (11) cross is come into contact with the equal loss profile expressed by a sphere of the equation (13). A ratio of the q-axis current values Ia and Ib is equal to a ratio of the thrust constants Ga(xi) and Gb(xi) at the position xi of the cart 201i. A ratio of the q-axis current values Ib and Ic is equal to a ratio of the thrust constants Gb(xj) and Gc(xj) at the position xj of the cart 201j.

As mentioned above, in the embodiment, the q-axis current values Ia to Ic are supplied to the coil units 116a to 116c on the basis of the positions xi and xj of the carts 201, the impedance R of the coil units 116a to 116c, and the ratio of the currents. The q-axis current values Ia to Ic which are supplied to the coil units 116a to 116c are current values which minimize the energy loss of the coil units 116a to 116c. Thus, even in the case where the cart 201i receives the current supply from the coil units 116a and 116b and the cart 201j receives the current supply from the coil units 116b and 116c, the energy loss due to the copper loss or the like can be reduced and the high accurate control can be made while suppressing the heat generation from the coils.

Fifth Embodiment

A moving-magnet type linear motor controlling system according to the fifth embodiment of the invention will be described hereinbelow. The fifth embodiment differs from the second embodiment with respect to a point that a ratio of the currents which are supplied to the coil units 116 is changed with an elapse of time in accordance with the positions of the carts 201, and other constructions are common. Therefore, a description of the common portions is omitted.

Figure 13:
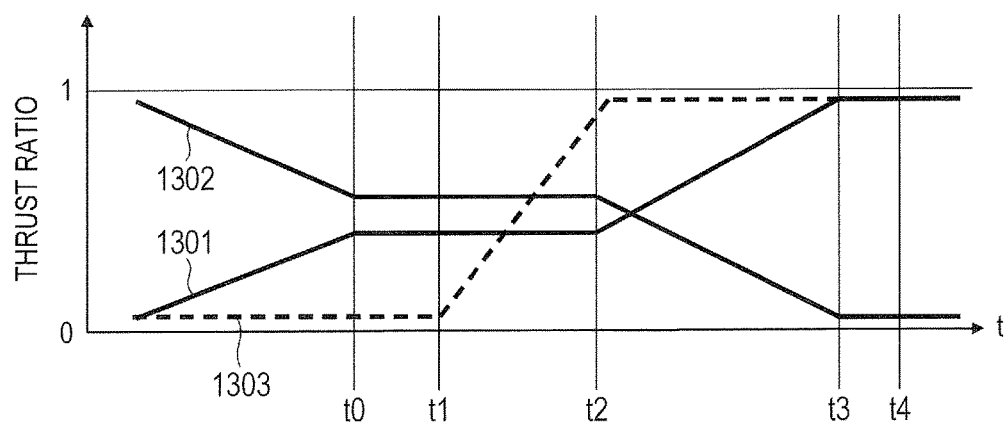
FIG. 13 is a diagram illustrating a time-dependent change of a thrust ratio according to the fifth embodiment of the invention.

The embodiment will be described with respect to a case where the cart 201i runs in the +x direction and stops at the position xi when the two carts 201i and 201j exist in an interval between the coil units 116a and 116c and the cart 201j has been stopped at the position xj as illustrated in FIGS. 8 and 9. FIG. 13 is a diagram illustrating a time-dependent change of a thrust ratio. In FIG. 13, it is assumed that a ratio of the magnitude of the thrust which the cart 201j illustrated in FIG. 8 receives from the coil unit 116c is equal to a thrust ratio 1301 and a ratio of the magnitude of the thrust which the cart 201j receives from the coil unit 116b is equal to a thrust ratio 1302. In FIG. 13, it is assumed that a ratio of the magnitude of the thrust which the cart 201i illustrated in FIG. 8 receives from the coil unit 116a is equal to a thrust ratio 1303.

It is assumed that time when the cart 201j has stopped at the position xj is equal to time t0 and time when the cart 201i has run in the +x direction and the coil unit 116a has started the generation of the thrust is equal to time t1.

Since the cart group controller 401 manages running situations of all carts 201 in the work machining system 100, time when the cart 201*i* reaches a region where an interaction occurs between the coil units 116*a* and 116*b* can be calculated. In FIG. 11, the region where the interaction occurs between the coil units 116*a* and 116*b* is a region where the thrust constant profiles 601*a* and 601*b* overlap partially. The cart group controller 401 calculates time when the cart 201*i* reaches a position xk (presumed position) where it can receive the thrust from the coil unit 116*b*, that is, time when the cart 201*i* reaches the region where the interaction occurs between the coil units 116*a* and 116*b*. For example, it is assumed that the cart group controller 401 calculated time t4 when the running cart 201*i* has reached the position xk. In this case, the cart group controller 401 sets the current which is supplied to the coil unit 116*b* to 0 at time t3 before time t4. The cart group controller 401 calculates a thrust which changes the current in association with the time-dependent change and outputs the thrust to the current calculating unit 407 through the transmitting path 433. The current controller 112*b* supplies the current to the coil unit 116*b* on the basis of the current value which was output from the current calculating unit 407. The thrust which is applied to the cart 201*j* by the coil unit 116*b* decreases gradually at time t2. The thrust which is applied to the cart 201*i* by the coil unit 116*b* is equal to 0 at time t3.

A reason why the thrust change associated with the elapse of time is decreased as mentioned above will be described hereinbelow. It is now assumed that in the case where the cart 201*i* reached the position xk, the current supply to the coil unit 116*b* has suddenly been stopped. In this case, since the thrust which is applied to the cart 201*j* also changes suddenly, the cart 201*j* receives a disturbance and a stopping position of the cart 201*j* fluctuates largely. In the embodiment, by gradually changing the current which is supplied to the coil unit 116*b* in association with the elapse of time, the thrust which is applied to the cart 201*j* from the coil unit 116*b* also decreases gradually, so that the disturbance which acts on the cart 201*j* can be suppressed.

As mentioned above, in the embodiment, before time when the cart 201*i* reaches the position where it receives the thrust from the coil unit 116*b*, the current which is supplied to the coil unit 116*b* is continuously changed in accordance with the elapse of time. Therefore, since the ratio of the thrust which is applied to the cart 201*j* continuously changes in accordance with the elapse of time, the cart 201*j* can be stably maintained at the stopping position xj.

Other Embodiments

The invention is not limited to the foregoing embodiments but various modifications are possible within a scope without departing from the spirit of the invention. For example, the current controller 112 corresponding to the coil unit 116 which does not apply a thrust to the cart 201 may turn off the switch 303 and electrically turn off the coil unit 116 which does not apply a thrust to the cart 201.

Although the second embodiment has been described with respect to the case where the coil unit 116*b* is electrically turned off, the coil unit 116*a* may be electrically turned off and the carts 201*i* and 201*j* may be controlled by the coil units 116*b* and 116*c*. In this case, the cart 201*i* is driven by only the coil unit 116*b* and the cart 201*j* is driven by the synthetic thrust acquired by synthesizing the thrusts of the coil units 116*b* and 116*c*.

Embodiment(s) of the present invention can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-207774, filed Oct. 22, 2015, which is hereby incorporated by reference herein in its entirety.

What is claimed is:

1. A moving-magnet type linear motor controlling system comprising:
   a plurality of coil units each having a plurality of coils;
   a position detecting unit configured to detect positions of a plurality of carts which are moved along the plurality of coil units; and
   a controlling unit configured to control currents which are supplied to the plurality of coil units on the basis of the positions of the plurality of carts,
   wherein, the plurality of coil units include a first coil unit, and second and third coil units adjacent to the first coil unit, and the plurality of carts include a first cart and a second cart, and
   when the first and second carts exist at positions where they receive a thrust from the first coil unit, the controlling unit controls the currents which are supplied to the first, second and third coil units on the basis of the positions of the first and second carts.

2. The system according to claim 1, wherein when the first cart exists at a position where it receives the thrust from the first coil unit and receives a thrust from the second coil unit, and the second cart exists at a position where it receives the thrust from the first coil unit and receives a thrust from the third coil unit, the controlling unit shuts off a current which is supplied to the first coil unit.

3. The system according to claim 1, wherein when the first cart exists at a position where it receives the thrust from the first coil unit and receives a thrust from the second coil unit, and the second cart exists at a position where it receives the thrust from only the first coil unit, the controlling unit controls the second coil unit to supply a thrust compensating for the thrust which the first cart receives from the first coil unit.

4. The system according to claim 1, wherein the controlling unit changes a ratio of the currents which are supplied to the first, second and third coil units in accordance with an elapse of time on the basis of the positions of the carts at a predetermined time.

5. The system according to claim 1, wherein the controlling unit determines a ratio of currents which are supplied to each of the plurality of coil units on the basis of the positions of the plurality of carts, and thrust characteristics and an impedance of the each of the plurality of coil units.

6. The system according to claim 1, wherein the controlling unit has a switch for electrically turning off the coil unit.

7. A manufacturing method of a part, wherein the part is manufactured using a moving-magnet type linear motor controlling system comprising:
   a plurality of coil units each having a plurality of coils;
   a position detecting unit configured to detect positions of a plurality of carts which are moved along the plurality of coil units; and
   a controlling unit configured to control currents which are supplied to the plurality of coil units on the basis of the positions of the plurality of carts,
   wherein, the plurality of coil units include a first coil unit, and second and third coil units adjacent to the first coil unit, and the plurality of carts include a first cart and a second cart, the method comprising:
   controlling, by the controlling unit, when the first and second carts exist at positions where they receive a thrust from the first coil unit, the ratio of the currents which are supplied to the first, second and third coil units on the basis of the positions of the first and second carts.

8. The system according to claim 1, wherein the controlling unit controls a ratio of currents supplied respectively to the first, second and third coil units, according to a ratio of thrust constants of the first, second and third coil units.

* * * * *